US011194772B2

(12) United States Patent
Bartlett et al.

(10) Patent No.: US 11,194,772 B2
(45) Date of Patent: Dec. 7, 2021

(54) PREPARING HIGH-QUALITY DATA REPOSITORIES SETS UTILIZING HEURISTIC DATA ANALYSIS

(71) Applicant: International Business Machines Corporation, Armonk, NY (US)

(72) Inventors: Neil E. Bartlett, Toronto (CA); Craig A. Statchuk, Kars (CA)

(73) Assignee: International Business Machines Corporation, Armonk, NY (US)

( * ) Notice: Subject to any disclaimer, the term of this patent is extended or adjusted under 35 U.S.C. 154(b) by 1075 days.

(21) Appl. No.: 15/420,474

(22) Filed: Jan. 31, 2017

(65) Prior Publication Data

US 2017/0140016 A1    May 18, 2017

Related U.S. Application Data

(63) Continuation of application No. 14/884,920, filed on Oct. 16, 2015.

(51) Int. Cl.
*G06F 16/21*    (2019.01)
*G06F 16/25*    (2019.01)
*G06F 16/23*    (2019.01)

(52) U.S. Cl.
CPC ......... *G06F 16/211* (2019.01); *G06F 16/254* (2019.01); *G06F 16/2365* (2019.01)

(58) Field of Classification Search
CPC ... G06F 16/254; G06F 16/211; G06F 16/2365
See application file for complete search history.

(56) References Cited

U.S. PATENT DOCUMENTS 9,613,115 B2 *  4/2017  Gulwani ............... G06F 16/258
2004/0083199 A1  4/2004  Govindugari et al.
(Continued)

FOREIGN PATENT DOCUMENTS

WO    WO 2015/016813 A1    2/2015

OTHER PUBLICATIONS

"List of IBM Patents or Patent Applications Treated as Related", Jan. 31, 2017, 2 pages.
(Continued)

*Primary Examiner* — Ashish Thomas
*Assistant Examiner* — Jedidiah P Ferrer
(74) *Attorney, Agent, or Firm* — Stephen J. Walder, Jr.; Alexander G. Jochym

(57) ABSTRACT

A mechanism is provided for preparing a high-quality data repository. Data and related metadata from a set of data sources are ingested thereby forming a set of unprepared data. The set of unprepared data is transformed based on a set of functions into a set of transformed data. A set of semantic text descriptions that detail the transformation of the set of unprepared data to the set of transformed data is generated using a first set of semantic associations, a second set of semantic associations, and a set of semantic transformation associations. The set of transformed data is tested against one or more governance policies that tracks data lineage to ultimately show that prepared data is in compliance. Responsive to the set of transformed data adhering to the one or more governance policies, a high-quality data repository is automatically built using the transformed data.

20 Claims, 5 Drawing Sheets

(56) References Cited

U.S. PATENT DOCUMENTS

| | | | |
|---|---|---|---|
| 2008/0306926 A1 | 12/2008 | Friedlander et al. | |
| 2009/0089078 A1 | 4/2009 | Bursey | |
| 2011/0055147 A1* | 3/2011 | Joerg | G06F 9/4843 |
| | | | 707/602 |
| 2012/0072391 A1 | 3/2012 | Simitsis et al. | |
| 2012/0095973 A1 | 4/2012 | Kehoe et al. | |
| 2012/0265726 A1 | 10/2012 | Padmanabhan et al. | |
| 2013/0144957 A1 | 6/2013 | Sherman et al. | |
| 2013/0238596 A1 | 9/2013 | Mandelstein et al. | |
| 2013/0260358 A1 | 10/2013 | Lorge et al. | |
| 2013/0325789 A1* | 12/2013 | Krishnan | G06F 16/254 |
| | | | 707/602 |
| 2013/0332407 A1 | 12/2013 | Faruquie et al. | |
| 2013/0332423 A1* | 12/2013 | Puri | G06F 16/219 |
| | | | 707/687 |
| 2014/0059030 A1* | 2/2014 | Hakkani-Tur | G06F 16/3338 |
| | | | 707/706 |
| 2016/0012028 A1 | 1/2016 | Schubert et al. | |
| 2016/0179901 A1* | 6/2016 | Roberts | G06F 16/9024 |
| | | | 707/756 |
| 2017/0011119 A1* | 1/2017 | Ghannam | G06F 16/3323 |

OTHER PUBLICATIONS

Booch, Grady et al., "The Unified Modeling Language User Guide", http://meusite.mackenzie.com.br/rogerio/the-unified-modeling-language-user-guide.9780201571684.997.pdf, Addison-Wesley Object Technology Series, 2nd Edition, May 2005, 391 pages.

Borst, Willem N., "Construction of Engineering Ontologies for Knowledge Sharing and Reuse", http://doc.utwente.nl/17864/1/t0000004.pdf, University of Twente, UTpublications, Thesis, Sep. 1997, 243 pages.

Brickley, Dan, "RDF vocabulary description language 1.0: RDF Schema", http://www.w3.org/TR/2004/REC-rdf-schema-20040210/, W3C Recommendation, Feb. 10, 2004, 12 pages.

Giunchiglia, Fausto et al., "Semantic matching: Algorithms and Implementation", http://eprints.biblio.unitn.it/1148/1/001.pdf, University of Trento, Department of Information and Communication Technology, Technical Report #DIT-07-001, Italy, Jan. 2007, 44 pages.

Golfarelli, Matteo et al., "The Dimensional Fact Model: A Conceptual Model for Data Warehouses", http://www-db.deis.unibo.it/~srizzi/PDF/ijcis98.pdf, International Journal of Cooperative Information Systems, vol. 7, Issue 2, Jun. 1998, 32 pages.

Huynh, David F. et al., "Potluck: Data Mash-Up Tool for Casual Users", http://m.imap.websemanticsjournal.org/index.php/ps/article/viewFile/154/152, Web Semantics: Science, Services and Agents on the World Wide Web, vol. 6, No. 4, Nov. 2008, 9 pages.

Lujan-Mora, Sergio et al., "Data Mapping Diagrams for Data Warehouse Design with UML", http://dss.gusconstan.com/DSS/documents/Data%20Mapping%20Diagrams.of%20DW%20in%20UML.pdf, Proceedings of the 23rd International Conference on Conceptual Modeling, Shanghai, China, Nov. 8-12, 2004, pp. 191-204.

Mazon, Jose-Norberto et al., "Applying MDA to the Development of Data Warehouses", http://www.cis.drexel.edu/faculty/song/dolap/dolap05/paper/p57-mazon.pdf, Proceedings of the 8th ACM international workshop on Data warehousing and OLAP, DOLAP'05, Bremen, Germany, Nov. 4-5, 2005, pp. 57-66.

McGuinness, Deborah L., "OWL Web Ontology Language Overview", http://www.kramirez.net/SMA_Maestria/Material/Presentaciones/Exposicion%20Ontologias/Documentos/OWL%20Web%20Ontology%20Language%20Overview.pdf, W3C Recommendation, Feb. 10, 2004, 19 pages.

Messmer, Bruno T. et al., "A New Algorithm for Error-Tolerant Subgraph Isomorphism Detection", IEEE Transactions on Pattern Analysis and Machine Intelligence, vol. 20, No. 5, May 1998, pp. 493-504.

Munoz, Lilia et al., "Automatic generation of ETL processes from conceptual models", ACM Digital Library, http://dl.acm.org/citation.cfm?id=1651298, retrieved from the internet Aug. 27, 2015, Abstract only, 2 pages.

Myers, Richard et al., "Bayesian Graph Edit Distance", http://eprints.whiterose.ac.uk/1988/1/hancocker4.pdf, IEEE Transactions on Pattern Analysis and Machine Intelligence, vol. 22, No. 6, Jun. 2000, 9 pages.

Petrovic, Milenko et al., "G-ToPSS: Fast Filtering of Graph-based Metadata", http://ftp.cs.toronto.edu/public_html/cs/ftp/public_html/pub/hfliu/papers/477-petrovic.pdf, In the 14th International World Wide Web Conference (WWW 2005), Chiba, Japan, May 10-14, 2005, 9 pages.

Rahm, Erhard et al., "Data Cleaning: Problems and Current Approaches", http://dc-pubs.dbs.uni-leipzig.de/files/Rahm2000DataCleaningProblemsand.pdf, IEEE Data Engineering Bulletin, Special Issue on Data Cleaning, vol. 23, No. 4, Dec. 2000, 11 pages.

Raman, Vijayshankar et al., "Potter's Wheel: An Interactive Data Cleaning System", http://www.vldb.org/conf/2001/P381.pdf, Proceedings of the 27th VLDB Conference, Roma, Italy, Sep. 11-14, 2001, 10 pages.

Romero, Oscar et al., "Automating Multidimensional Design from Ontologies", http://citeseerx.ist.psu.edu/viewdoc/download?doi=10.1.1.144.2755&rep=rep1&type=pdf, DOLAP'07, Lisboa, Portugal, Nov. 9, 2007, 8 pages.

Sanfeliu, Alberto et al., "A Distance Measure Between Attributed Relational Graphs for Pattern Recognition", IEEE Transactions on Systems, Man, and Cybernetics, vol. smc-13, No. 3, May/Jun. 1983, pp. 353-362.

Schvaiko, Pavel, "A classification of schema-based matching approaches", http://eprints.biblio.unitn.it/654/1/093.pdf, University of Trento, Department of Information and Communication Technology, Technical Report #DIT-04-093, Trento, Italy, Aug. 2004, 14 pages.

Simitsis, Alkis, "Natural Language Reporting for ETL Processes", http://www.dbnet.ece.ntua.gr/pubs/uploads/TR-2008-10.pdf, DOLAP'08, Napa Valley, California, Oct. 30, 2008, 8 pages.

Skoutas, Dimitrios et al., "Flexible and Customizable NL Representation of Requirements for ETL Processes", http://link.springer.com/chapter/10.1007/978-3-540-73351-5_42, Proceedings of the 12th International Conference of NLDB 2007, Paris, France, Jun. 27-29, 2007, Abstract only, 4 pages.

Skoutas, Dimitrios et al., "Ontology-based Conceptual Design of ETL Processes for both Structured and Semi-structured Data", http://www.dblab.ece.ntua.gr/pubs/uploads/TR-2007-20.pdf, International Journal on Semantic Web and Information Systems, vol. 3, Issue 4, Oct. 2007, 20 pages.

Skoutas, Dimitrios et al., "Ontology-driven Conceptual Design of ETL Processes using Graph Transformations*", http://citeseerx.ist.psu.edu/viewdoc/download?doi=10.1.1.367.5736&rep=rep1&type=pdf, Journal on Data Semantics, XIII, Lecture Notes in Computer Science, vol. 5530, Aug. 2009, 28 pages.

Vassiliadis, Panos et al., "A Generic and Customizable Framework for the Design of ETL Scenarios", http://web.imis.athena-innovation.gr/~mter/papers/is2005.pdf, Information Systems, vol. 30, Issue 7, Nov. 2005, pp. 492-525.

Vassiliadis, Panos, "Conceptual Modeling for ETL Processes", http://www.cci.drexel.edu/faculty/song/dolap/dolap02/paper/p14-vassiliadis.pdf, DOLAP'02, Nov. 8, 2002, pp. 14-21.

* cited by examiner

PREPARING HIGH-QUALITY DATA REPOSITORIES SETS UTILIZING HEURISTIC DATA ANALYSIS

BACKGROUND

The present application relates generally to an improved data processing apparatus and method and more specifically to mechanisms for preparing high-quality data repositories sets utilizing heuristic data analysis.

For several decades, data repositories have been built using various types of Extract, Transform, and Load (ETL) procedures. ETL, is used to prepare data with consistent values that work effectively for data repository operations, such as retrieval, sorting, grouping, calculations, and the like. ETL procedures typically produce data that is normalized for use with Not Only Structured Query Language (NoSQL), Structured Language (SQL), and MultiDimensional eXpression (MDX) access methods. Modelling constraints, such as, First Normal Form (INF) and Third Normal Form (3NF) are commonly used to avoid data duplication and inconsistency that enforce proper referential integrity, cardinality, and SQL query keys.

ETL procedures may be complex and difficult to create. Specialized skills are needed to categorize and normalize even simple data. Data sets also change over time which may add to such technical challenges. In many systems, significant amounts of software must be written in the form of program code, scripts, or definitions of rules in order to categorize and normalize data repositories for uniform utilization. That is, because of ETL's maturity, ETL tools are comprehensive and varied. Related stages of data preparation are well documented by practitioners and academics. The persona for an ETL user includes significant IT and data repository skills, which limits the number of potential users and typically creates a backlog of users needing ETL coding to be performed. While ETL does an excellent job preparing data, users who rely on ETL data often complain about long wait times for getting new data added to operation systems. While there are alternatives to ETL, such as business analytics products like those from Tableau® and Qlik®, which have self-serve platforms for collecting and organizing new data, as these products gain in popularity, the amount of uncertain data also increases. Primary requirements for enterprise quality data, including level of certainty and trust, are not always achievable using self-serve data preparation methods.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system, is provided for preparing a high-quality data repository. The illustrative embodiment ingests data and related metadata from a set of data sources thereby forming a set of unprepared data. The illustrative embodiment transforms the set of unprepared data based on a set of functions into a set of transformed data. The illustrative embodiment generates a set of semantic text descriptions that detail the transformation of the set of unprepared data to the set of transformed data using a first set of semantic associations, a second set of semantic associations, and a set of semantic transformation associations. The illustrative embodiment tests the set of transformed data against one or more governance policies that tracks data lineage to ultimately show that prepared data is in compliance. Responsive to the set of transformed data adhering to the one or more governance policies, the illustrative embodiment automatically builds the high-quality data repository using the transformed data.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
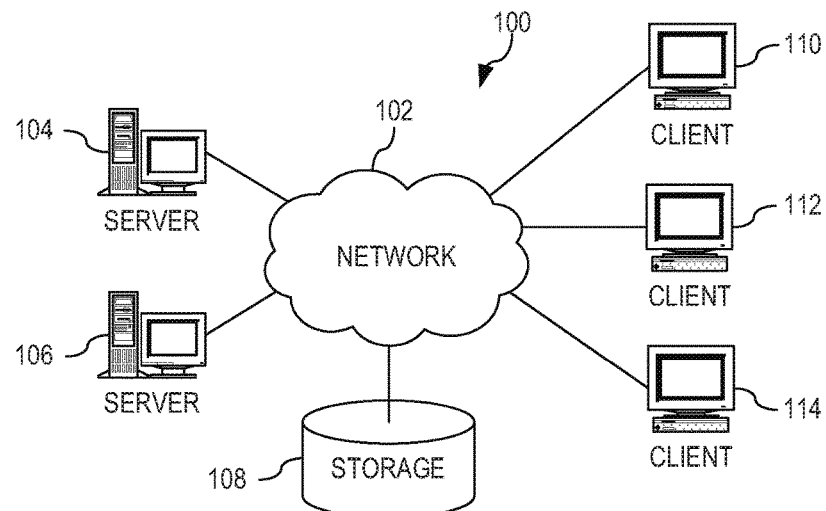
FIG. 1 is an example diagram of a distributed data processing system in which aspects of the illustrative embodiments may be implemented.

The illustrative embodiments provide mechanisms for preparing high-quality data repositories based on a knowledge corpus of previously prepared content and a context accumulator for ontologies that builds a catalog of physical data structures allowing source data to be prepared for further analysis in the most suitable data access formats used by analytics applications. The mechanisms transform and model incoming data as rows of data containing one or more data items. The mechanisms build a data catalog that describe how incoming data may be transformed into other normalized forms that logically align data into columns with similar types of data items. This data catalog is not built or maintained manually using a traditional authoring tool. Instead, the mechanisms construct the data catalog using heuristic analysis of existing enterprise data and metadata. Heuristic analysis is an expert based analysis that determines the susceptibility of a system towards using various decision rules or weighing methods based on previously analyzed data. The result of the analysis by the mechanism of the illustrative embodiments is a data repository that may be dynamically transformed or physically constructed from source data so the data repository may be efficiently queried using familiar Not Only. Structured Query Language (NoSQL), Structured Query Language (SQL), and MultiDimensional eXpression (MDX) access methods.

Before beginning the discussion of the various aspects of the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Figure 2:
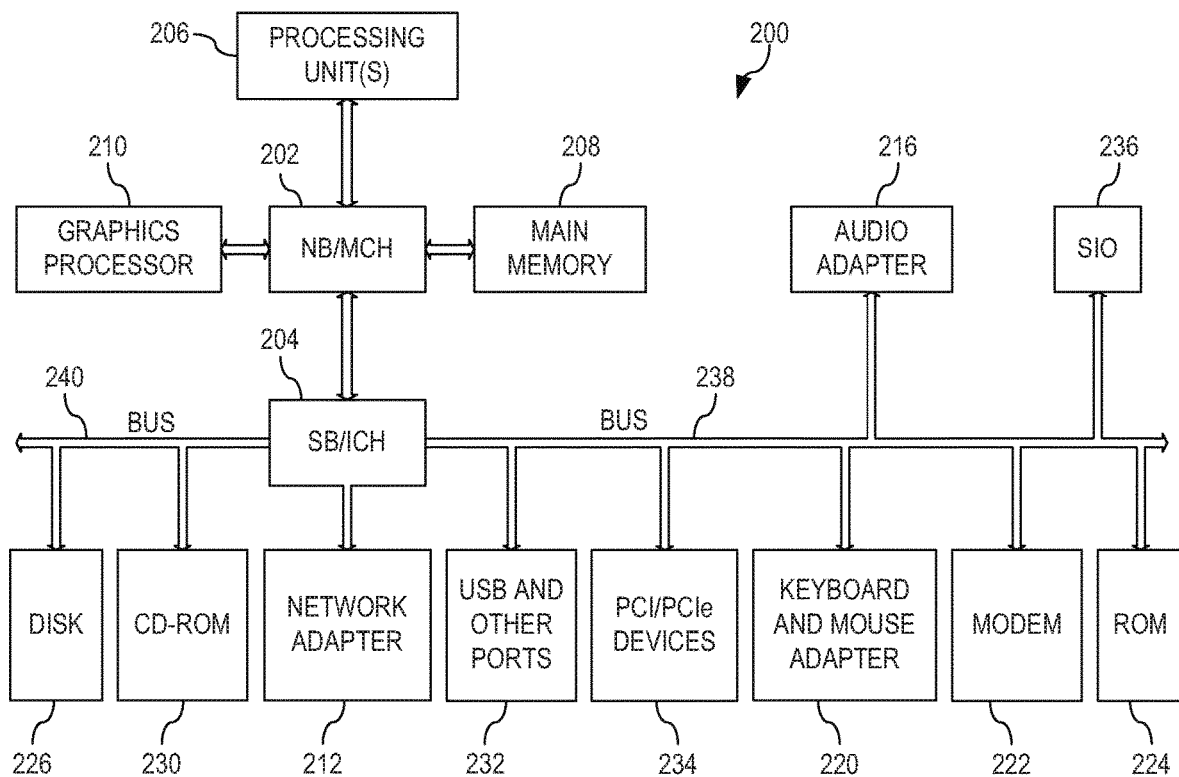
FIG. 2 is an example block diagram of a computing device in which aspects of the illustrative embodiments may be implemented.

Thus, the illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

As shown in FIG. 1, one or more of the computing devices, e.g., server 104, may be specifically configured to implement a high-quality data repository preparation mechanism that utilizes heuristic analysis. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as server 104, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates preparing high-quality data repositories sets utilizing heuristic data analysis.

As noted above, the mechanisms of the illustrative embodiments utilize specifically configured computing devices, or data processing systems, to perform the operations for preparing high-quality data repositories so the data repository may be efficiently queried using familiar access methods. These computing devices, or data processing systems, may comprise various hardware elements which are specifically configured, either through hardware configuration, software configuration, or a combination of hardware and software configuration, to implement one or more of the systems/subsystems described herein. FIG. 2 is a block diagram of just one example data processing system in which aspects of the illustrative embodiments may be implemented. Data processing system 200 is an example of a computer, such as server 104 in FIG. 1, in which computer usable code or instructions implementing the processes and aspects of the illustrative embodiments of the present invention may be located and/or executed so as to achieve the operation, output, and external affects of the illustrative embodiments as described herein.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202, Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240, PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment SATA interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM eServer™ System p® computer system, Power™ processor based computer system, or the like, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

As mentioned above, in some illustrative embodiments the mechanisms of the illustrative embodiments may be implemented as application specific hardware, firmware, or the like, application software stored in a storage device, such as HDD 226 and loaded into memory, such as main memory 208, for executed by one or more hardware processors, such as processing unit 206, or the like. As such, the computing device shown in FIG. 2 becomes specifically configured to implement the mechanisms of the illustrative embodiments and specifically configured to perform the operations and generate the outputs described hereafter with regard to preparing high-quality data repositories.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Figure 3:
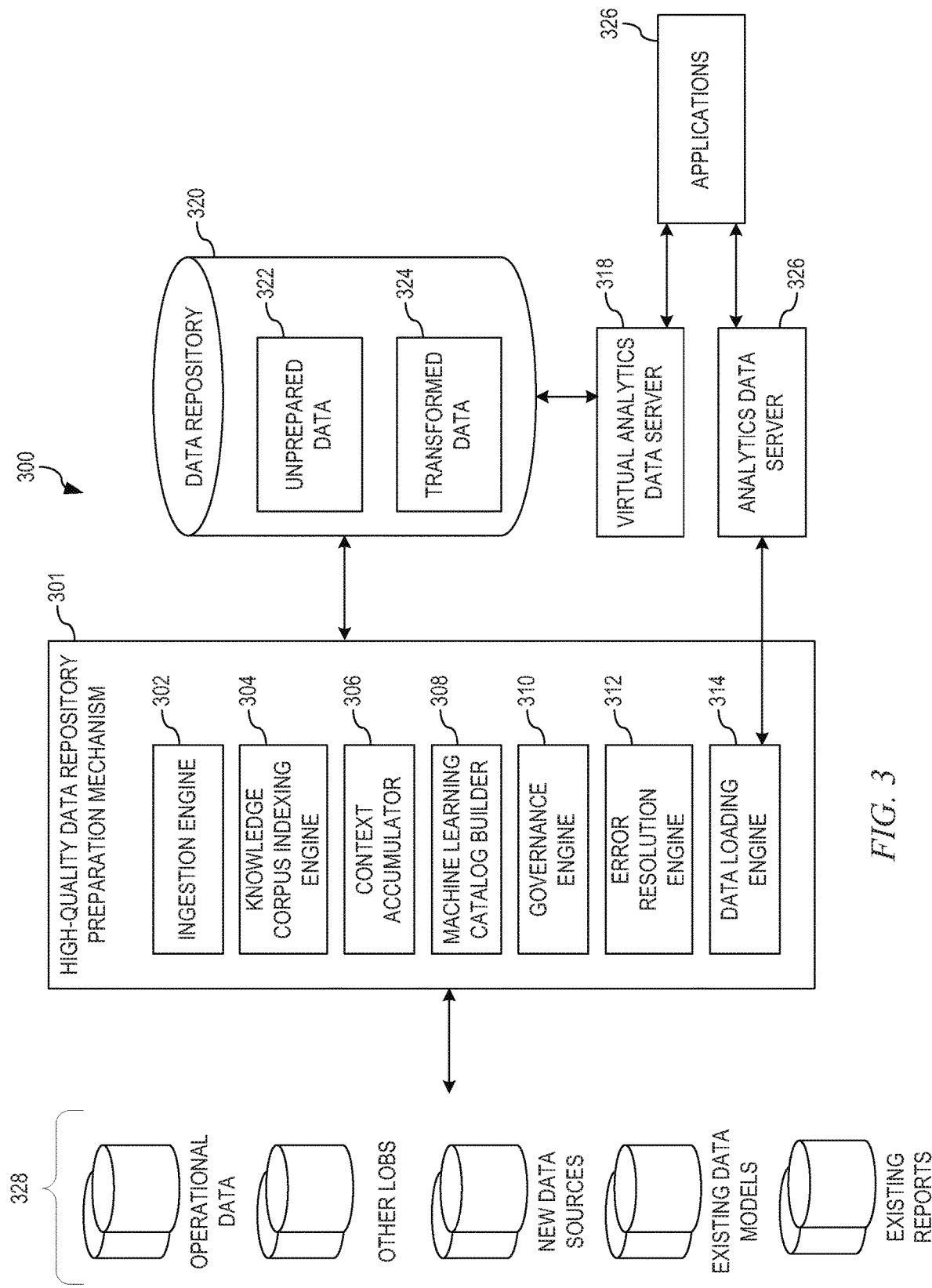
FIG. 3 depicts a functional block diagram of just such a high-quality data repository preparation mechanism in accordance with an illustrative embodiment.

Within a data processing system, such as data processing system 200 of FIG. 2, the mechanisms of the illustrative embodiments preparing high-quality data repositories based on a knowledge corpus of previously prepared content and a context accumulator for ontologies that builds a catalog of physical data structures allowing source data to be prepared for further analysis in the most suitable data access formats used by analytics applications. FIG. 3 depicts a functional block diagram of just such a high-quality data repository preparation mechanism in accordance with an illustrative embodiment. High-quality data repository preparation mechanism 301 in data processing system 300 comprises ingestion engine 302, knowledge corpus indexing engine 304, context accumulator 306, machine learning catalog builder 308, governance engine 310, error resolution engine 312, and data loading engine 314. In order to prepare data that may be efficiently analyzed in the most suitable data access formats for use by numerous analytics applications, initially, ingestion engine 302 identifies new data sources to be added to data repository 320 from one or more of operational data, Large Objects (LOBs), SecureFiles LOBs, and Database File Systems (DBFS), existing data models, existing reports, or the like. Ingestion engine 302 ingests data and related metadata 328 from the data sources, the data being preferably organized into tables with discernable rows and columns where possible, although ingestion engine 302 may ingest any type of data by adhering to predefined rules for ingesting such data and metadata. The predefined rules are rules that allow the ingestion engine to ingest data from other less familiar data systems based on the type and format of the data in the data systems. Ingestion engine 302 stores the results of the data ingestion as unprepared data 322 into data repository 320 in a predefined format with new columns added as required to normalize the ingested data so the data may be used in an enterprise-wide processing environment. Ingestion engine 302 may utilize any suitable storage management system to store unprepared data 322 such as Database Management System (DBMS), Hadoop Distributed File System (HDFS), or the like. The unprepared data and related metadata is used repeatedly during the analysis and cataloging operations that follow.

Utilizing unprepared data 322, knowledge corpus indexing engine 304 transforms the unprepared data 322 into a set of keywords, facets, data clusters, or the like. That is, knowledge corpus indexing engine 304 is a full-text search and index mechanism that tokenizes and stores data values from the unprepared data 322 for rapid retrieval. In accordance with the illustrative embodiments, tokenizing means to break the data into individual words, optionally resolving aliases, and identifying common stop words like "the", "a" and "it", which is utilized to build an inverted index allowing for searches for such words. Knowledge corpus indexing engine 304 initially defines the unprepared data 322 as a set of data D that is an arbitrary collection of cells, typically organized as rows and columns. Knowledge corpus indexing engine 304 then generates a set of transformed data $D_1$ by applying a set of functions $F_1, F_2, \ldots, F_n$ to the set D, such that:

$$D_t = F_n(\ldots F_2(F_1(D))).$$

Each of the functions $F_1, F_2, \ldots, F_n$ are predefined functions that perform an operation on the unprepared data 322, such as, transforming to align with a particular schema, taxonomy, filtering criteria, or the like.

Associated with each function $F_n$ is a text description $T_n$ that details how that function acts on the unprepared data 322 as the data is transformed from D to $D_t$. While initial text descriptions $T_n$ are created manually by an operator, over time, knowledge corpus indexing engine 304 creates new and/or modify existing text descriptions $T_n$ that describe new transformations in terms of the set of text descriptions $T_1, T_2, \ldots, T_n$ based on the set of functions $F_1, F_2, \ldots F_n$ that are applied to the unprepared data 322. Knowledge corpus indexing engine 304 stores the transformed data $D_t$ as well as the set of text descriptions $T_1, T_2, \ldots, T_n$ as transformed data $D_t$ 324 in data repository 320.

In order to exemplify the process performed by knowledge corpus indexing engine 304, consider that the set of data D is a set of credit card transactions comprising date, location, seller, card number, product category, and amount fields. By applying one or more functions as described above, knowledge corpus indexing engine 304 generates a set of transformed data $D_t$ 324 that adds fiscal quarter, vendor name, card holder credit limit, card holder address, product category and U.S. dollar ($) conversion fields. That is, utilizing the date field from the set of data D, knowledge corpus indexing engine 304 applies a function "Fiscal quarter assignment (DatetoFQ)" that converts the calendar date to corporate fiscal quarter. Utilizing the location field, knowledge corpus indexing engine 304 applies a function "Location to store lookup (StoreFinder)" that identifies a store vendor name and number for given credit terminal ID of the location field. Utilizing the card number field, knowledge corpus indexing engine 304 applies a function "Customer number look up (CustomerDetails)" that identifies customer details by card number, e.g. card holder credit limit and card holder address. Utilizing the product field, knowledge corpus indexing engine 304 applies a function "Product category determination (ProductCategory)" that identifies a product category for a given vendor description. Finally, utilizing the amount field, knowledge corpus indexing engine 304 applies a function "$US Value (ExchangeRateConv)" that identifies the U.S. currency value if the value is different than in U.S. dollars ($).

Utilizing the unprepared data 322 and the transformed data $D_t$ 324 from data repository 320, context accumulator 306 builds a set of semantic associations $S_1, S_2, \ldots, S_n$ for concepts $C_a, C_b, \ldots, C_z$ related to each D to $D_t$ transformation. The concepts utilized in this operation are extracted using Natural Language Processing (NLP) and/or Text Analytics. For example, if a sentence states "Blue Jays are on top", then NLP and/or text analysis would determine that 'Blue Jays' is a noun for the Toronto MLB team, 'on' is the preposition that connects to the phrase that follows, and 'top' is the adjective alias for 'top of the MLB standings" thus identifying the concept of the sentence. That is, associated with each set of data D in unprepared data 322 there is a concept C that defines the data in the respective set of data D. Similarly, associated with each set of transformed data $D_t$ in transformed data $D_t$ 324 there is a concept $C_t$ that defines the data in the respective set of transformed data $D_t$. Based on the identified concepts, context accumulator 306 identifies a semantic association $S_n$, between each concept C and one or more other concepts C in the set of data D as well as, between each concept $C_t$ and one or more other concepts $C_t$ in the set of transformed data $D_t$. General examples of the identified semantic associations $S_n$ are verbs/verb phrases like: contains, is a part of, is a customer of, buys from, or the like. In addition to identifying semantic associations $S_n$ between each concept C and one or more other concepts C in the set of data D as well as between each concept $C_t$ and one or more other concepts $C_t$ in the set of transformed data $D_t$, context accumulator 306 also identifies semantic transformation associations $S_{Tn}$, between each concept C in the set of data D and one or more other concepts C in the set of transformed data $D_t$. General examples of the identified semantic transformation associations $S_{Tn}$ are attributes that categorize a transformation, such as is alias of, has unique values, is a customer number, is a complete postal address, or the like. At this point, context accumulator 306 may present a list of the identified semantic transformation associations $S_{Tn}$ to an operator for validation and/or modification. This is particularly important in the initial passes where the high-quality data repository preparation mechanism has little or no existing content to learn from. Context accumulator 306 may also generate semantic text descriptions $T_{S1}, T_{S2}, \ldots, T_{Sn}$ that detail how data is converted from D to $D_t$ in terms of the set of text descriptions $T_1, T_2, \ldots, T_n$, the set of semantic transformation associations $S_{T1}, S_{T2}, \ldots, S_{Tn}$, and the set of semantic associations $S_1, S_2, \ldots, S_n$. Thus, context accumulator 306 identifies and stores entity relations discovered in the unprepared data 322 to form an information science ontology, which is a formal naming and definition of the types, properties, and interrelationships of the entities that really or fundamentally exist for a particular domain of discourse.

Machine learning catalog builder 308 uses the unprepared data 322, the transformed data $D_t$ 324, the set of text descriptions $T_1, T_2, \ldots, T_n$, the set of semantic transformation associations $S_{T1}, S_{T2}, \ldots, S_{Tn}$, the set of semantic associations $S_1, S_2, \ldots, S_n$, and the semantic text descriptions $T_{S1}, T_{S2}, \ldots, T_{Sn}$ to build a data catalog for new data $D_N$ that has not been previously analyzed by data processing system 300. That is, some new data $D_N$ ingested by ingestion engine 302 may have different field names other than what has previously been processed by knowledge corpus indexing engine 304 and context accumulator 306. For example, in contrast to the example provided above, new data $D_N$ may have field names Trans d/m/yy, Lat/Long, Credit #, and Amt. By comparing new data $D_N$ with existing data and/or metadata values in the transformed data $D_t$ 324 produced by knowledge corpus indexing engine 304 and the set of text descriptions $T_1, T_2, \ldots, T_n$, the set of semantic transformation associations $S_{T1}, S_{T2}, \ldots, S_{Tn}$, the set of semantic associations $S_1, S_2, \ldots, S_n$, and the semantic text descriptions $T_{S1}, T_{S2}, \ldots, T_{Sn}$ (i.e. the information science ontology) produced by context accumulator 306, machine learning catalog builder 308 builds a data catalog that describes that data in each source row, how items in the respective source row relates to other cataloged rows and normalized data structures, how rows may be transformed into other normalized forms that align data into columns with similar data items, or the like.

Thus, machine learning catalog builder 308 implements a machine learning process that is trained to find an appropriate function F when new data $D_N$ is presented. While an operator may provide a field from the transformed data $D_t$ or offer a description of the function F that is needed to transform the new data $D_N$, machine learning catalog builder 308 uses the set of text descriptions $T_1, T_2, \ldots, T_n$ and the transformed data $D_t$ to offer recommendations for functions F to be used to transform the new data $D_N$. Machine learning catalog builder 308 may present the recommended functions F for each portion of the new data $D_N$ based on confidence levels with regard to which function would be best to transform the new data $D_N$. Machine learning catalog builder 308 may rank the recommended functions F based on the confidence levels. Either based on an operator's selection or if one of a recommended functions F is above a predetermined threshold for each portion of the new data $D_N$, machine learning catalog builder 308 provides an identification of the selected function F for each portion of the new data $D_N$ to knowledge corpus indexing engine 304 and context accumulator 306 so that the new data $D_N$ may be processed as described above.

Once all data has been processed and augmented as described previously, governance engine 310 reads the data D, the transformed data $D_t$, and the utilized functions F and tests the transformed data. $D_t$ against one or more governance policies that tracks data lineage to ultimately show that prepared data is in compliance. If governance engine 310 indicates that all governance policies have been adhered to, then Extract, Transform, and Load (ETL) transformation for the set of data D may be generated without coding or other interventions. However, if governance engine 310 indicates that one or more of the governance policies have not been adhered to, error resolution engine 312 presents the transformed data $D_t$ to an operator who changes data preparation parameters or manually updates transformations with correct values. Once the data preparation parameters have been changed or the transformations manually updated, the above process is repeated until governance engine 310 indicates that all governance policies have been adhered to.

Once all governance policies have been adhered to, data loading engine 314 reads the transformed data $D_t$ 324 from data repository 320 and builds one or more enterprise reporting warehouses, data marts, tables, or the like without the need for manually maintained ETL processes. Data loading engine 314 may provide the enterprise reporting warehouses, data marts, tables, or the like to analytics data server 316. Analytics data server 316 may use the transformed data $D_t$ 324 using industry standard methods, such as Not Only Structured Query Language (NoSQL), Structured Query Language (SQL), MultiDimensional eXpression (MDX), or the like. Similarly, virtual analytics data server 318 may dynamically utilize transformed data $D_t$ 324 from data repository 320 to create virtual reporting warehouses, data marts, tables, or the like and provide access using industry standard methods, including Software as a Service (SaaS), Representational State Transfer (REST), application program interfaces (APIs), or the like. Whether the data is accessible through analytics data server 316 or virtual analytics data server 318, the data may be queried by applications 326 using familiar and appropriate access methods.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 4:
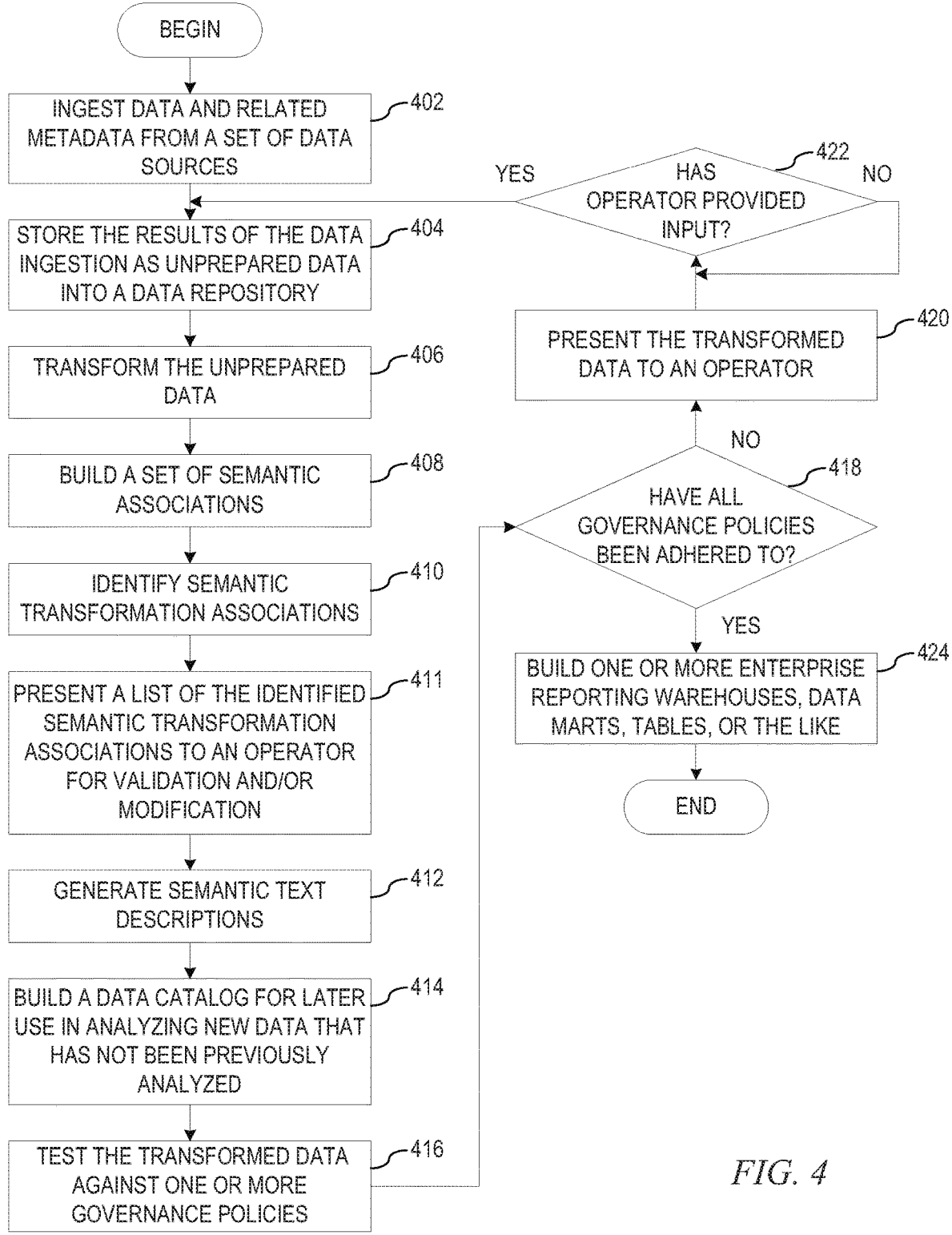
FIG. 4 depicts an exemplary flowchart of the operation performed by a high-quality data repository preparation mechanism in accordance with an illustrative embodiment.

FIG. 4 depicts an exemplary flowchart of the operation performed by a high-quality data repository preparation mechanism in accordance with an illustrative embodiment. As the operation begins, an ingestion engine ingests data and related metadata from a set of data sources (step 402). The ingestion engine stores the results of the data ingestion as unprepared data into a data repository (step 404). The ingestion engine stores the data in a predefined format with new columns added as required to normalize the ingested data so the data may be used in an enterprise-wide processing environment. Utilizing the unprepared data, a knowledge corpus indexing engine transforms the unprepared data into a set of keywords, facets, data clusters, or the like, based on a set of functions $F_1, F_2, \ldots, F_n$ that each have an associated text description $T_n$, that details how that function acts on the unprepared data as the data is transformed to form transformed data $D_t$ (step 406). A context accumulator then uses the unprepared data D and the transformed data $D_t$ to build a set of semantic associations $S_1, S_2, \ldots, S_n$, for concepts $C_a, C_b, \ldots, C_z$ related to each portion of data in the unprepared data D and each portion of data in the transformed data $D_t$ (step 408).

The context accumulator also identifies semantic transformation associations $S_{Tn}$, between each concept C in the unprepared data D and one or more other concepts C in the transformed data $D_t$ (step 410). At this point, the context accumulator may present a list of the identified semantic transformation associations $S_{Tn}$ to an operator for validation and/or modification (step 411). This is particularly important in the initial passes where the high-quality data repository preparation mechanism has little or no existing content to learn from. The context accumulator also generates semantic text descriptions $T_{S1}, T_{S2}, \ldots, T_{Sn}$ (step 412) that detail how data is converted from D to $D_t$ in terms of the set of text descriptions $T_1, T_2, \ldots, T_n$, the set of semantic transformation associations $S_{T1}, S_{T2}, \ldots, S_{Tn}$, and the set of semantic associations $S_1, S_2, \ldots, S_n$. Thus, the context accumulator identifies and stores entity relations discovered in the unprepared data to form an information science ontology, which is a formal naming and definition of the types, properties, and interrelationships of the entities that really or fundamentally exist for a particular domain of discourse.

A machine learning catalog builder uses the unprepared data, the transformed data $D_t$, the set of text descriptions $T_1, T_2, \ldots, T_n$, the set of semantic transformation associations $S_{T1}$, $S_{T2}$, ..., $S_{Tn}$, the set of semantic associations $S_1$, $S_2$, ..., $S_n$, and the semantic text descriptions $T_{S1}$, $T_{S2}$, ..., $T_{Sn}$ to build a data catalog for later use in analyzing new data $D_N$ that has not been previously analyzed by the data processing system (step 414). Once all data has been processed and augmented, a governance engine tests the transformed data $D_t$ against one or more governance policies that tracks data lineage to ultimately show that prepared data is in compliance using the unprepared data D, the transformed data. $D_t$, and the utilized functions F (step 416). The governance engine determines whether all governance policies have been adhered to (step 418). If at step 418 the governance engine identifies that all of the governance policies have not been adhered to, an error resolution engine presents the transformed data $D_t$ to an operator who changes data preparation parameters or manually updates transformations with correct values (step 420).

The error resolution engine then determines whether the operator has changed the data preparation parameters or manually updated the transformations (step 422). If at step 422 the error resolution engine determines that the operator has not changed the data preparation parameters or manually updated the transformations, the operations returns to step 420. If at step 422 the error resolution engine determines that the operator has changed the data preparation parameters or manually updated the transformations, the operation returns to step 404. If at step 418 the governance engine identifies that all of the governance policies have been adhered to, a data loading engine builds one or more enterprise reporting warehouses, data marts, tables, or the like, using the transformed data $D_t$ and without the need for manually maintained ETL processes (step 424), with the operations ending thereafter.

Figure 5:
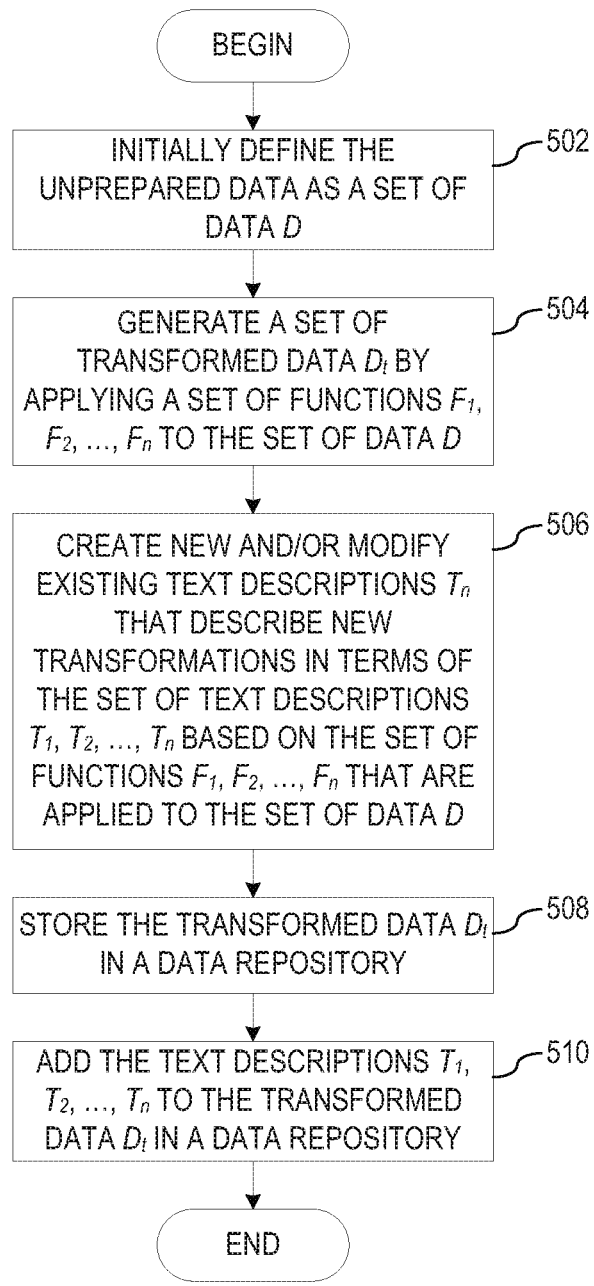
FIG. 5 depicts an exemplary flowchart of the operation performed by a knowledge corpus indexing engine in transforming unprepared data in accordance with an illustrative embodiment.

FIG. 5 depicts an exemplary flowchart of the operation performed by a knowledge corpus indexing engine in transforming unprepared data in accordance with an illustrative embodiment. As the operation begins, the knowledge corpus indexing engine initially defines the unprepared data as a set of data D that is an arbitrary collection cells, typically organized as rows and columns (step 502). The knowledge corpus indexing engine then generates a set of transformed data $D_t$ by applying a set of functions $F_1, F_2, \ldots, F_n$ to the set of data D (step 504), such that:

$$D_t = F_n(\ldots F_2(F_1(D)))).$$

Each of the functions $F_1, F_2, \ldots, F_n$ are predefined functions that perform an operation on the unprepared data, such as transforming to align with a particular schema, taxonomy, filtering criteria, or the like.

Associated with each function $F_n$ is a text description $T_n$ that details how that function acts on the unprepared data as the data is transformed from D to $D_t$. While initial text descriptions $T_n$ are created manually by an operator, over time, the knowledge corpus indexing engine creates new and/or modifies existing text descriptions $T_n$ that describe new transformations in terms of the set of text descriptions $T_1, T_2, \ldots, T_n$ based on the set of functions $F_1, F_2, \ldots, F_n$ that are applied to the set of data D (step 506). The knowledge corpus indexing engine stores the transformed data $D_t$ in a data repository (step 508). The knowledge corpus indexing engine then adds the text descriptions $T_1, T_2, \ldots, T_n$ to the transformed data $D_t$ in a data repository (step 510), with the operation ending thereafter.

Figure 6:
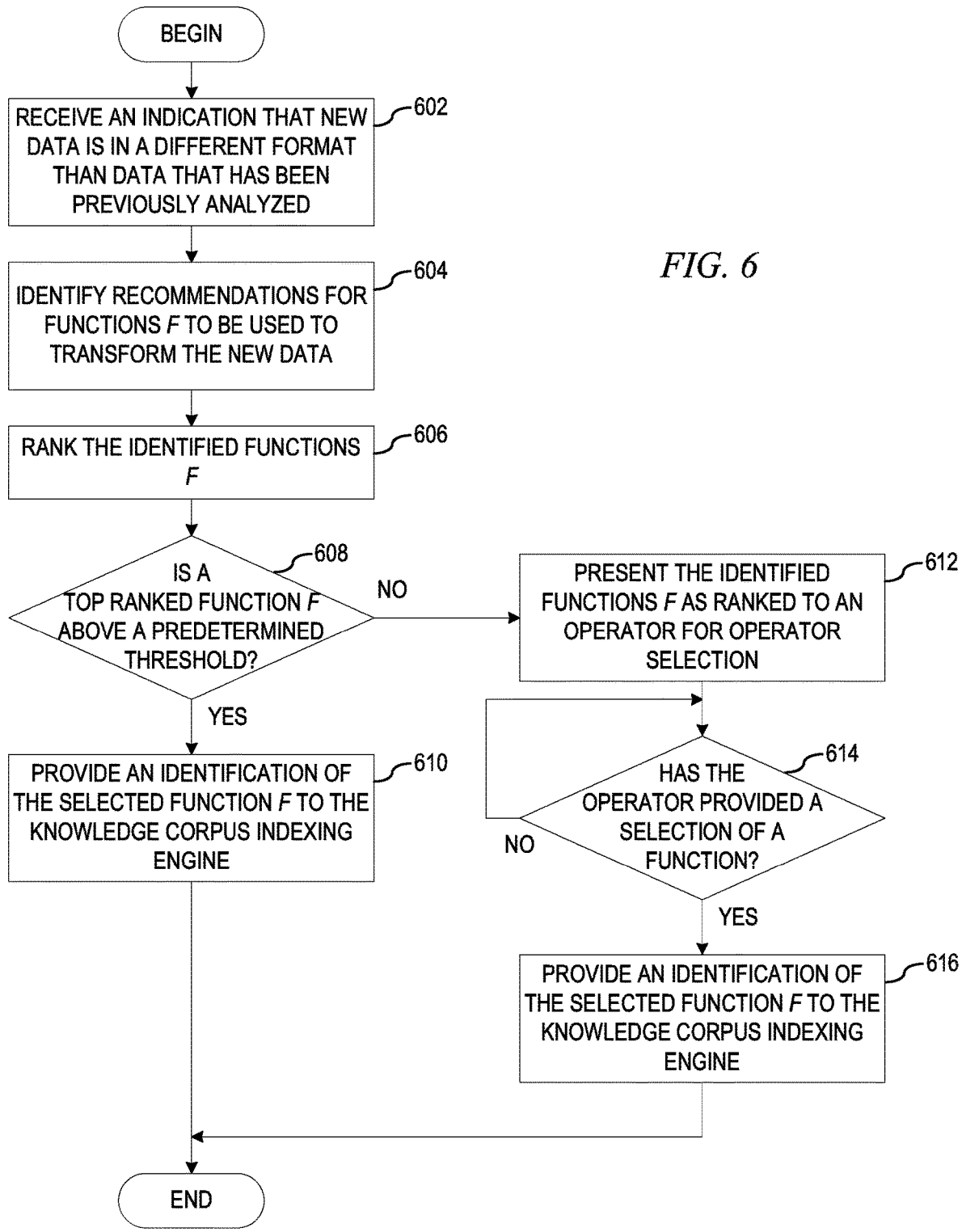
FIG. 6 depicts an exemplary flowchart of the operation performed by a machine learning catalog builder in assisting in analyzing new data in accordance with an illustrative embodiment.

FIG. 6 depicts an exemplary flowchart of the operation performed by a machine learning catalog builder in assisting in analyzing new data in accordance with an illustrative embodiment. As the operation begins, the machine learning catalog builder receives an indication from a knowledge corpus indexing engine that new data is in a different format than data that has been previously analyzed (step 602). For each field in the new data, the machine learning catalog builder uses a set of text descriptions $T_1, T_2, \ldots, T_n$ and previously transformed data $D_t$ to identify recommendations for functions F to be used to transform the new data (step 604). That is, the machine learning catalog builder compares function definitions and descriptions associated with the new data to existing functions and descriptions associated with previously transformed data $D_t$. The machine learning catalog builder ranks the identified functions F (step 606) and determines whether a top ranked function F is above a predetermined threshold (step 608). If at step 608 the top ranked identified function is above the predetermined threshold, the machine learning catalog builder provides an identification of the selected function F to the knowledge corpus indexing engine so that the new data may be processed (step 610), with the operation ending thereafter. If at step 608 no identified function is above the predetermined threshold, the machine learning catalog builder presents the identified functions F as ranked to an operator for operator selection (step 612). The machine learning catalog builder then determines whether the operator has provided a selection of a function (step 614). If at step 614 the machine learning catalog builder determines that the operator has not selected a function, the operation returns to step 614. If at step 614 the machine learning catalog builder determines that the operator has selected a function, the machine learning catalog builder provides an identification of the selected function F to the knowledge corpus indexing engine so that the new data may be processed (step 616), with the operation ending thereafter.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, Which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or early out combinations of special purpose hardware and computer instructions.

Thus, the illustrative embodiments provide mechanisms for preparing high-quality data repositories based on a knowledge corpus of previously prepared content and ontologies that builds a catalog of physical data structures allowing source data to be prepared for further analysis in the most suitable data access formats used by analytics applications. The mechanisms transform and model incoming data and build a data catalog that describe how incoming data may be transformed into other normalized forms that logically align data into columns with similar types of data items. The mechanisms construct the data catalog using heuristic analysis of existing enterprise data and metadata. The result of the analysis by the mechanism of the illustrative embodiments is a data repository that may be dynamically transformed or physically constructed from source data so the data repository may be efficiently queried using familiar access methods.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising a processor and a memory coupled to the processor, for preparing a data repository, the method comprising:
   ingesting, by the data processing system, data and metadata related to the data from a set of data sources thereby forming a set of unprepared data;
   transforming, by the data processing system, the set of unprepared data based on a set of functions into a set of transformed data;
   generating, by the data processing system, a set of semantic text descriptions that detail how the set of functions transform the set of unprepared data to the set of transformed data using a first set of semantic associations, a second set of semantic associations, and a set of semantic transformation associations, wherein the first set of semantic associations are generated between two or more concepts in the set of unprepared data, wherein the first set of semantic associations are verbs or verb phrases, wherein the second set of semantic associations are generated between two or more concepts in the set of transformed data, wherein the second set of semantic associations are verbs or verb phrases, wherein the set of semantic transformation associations are generated between each concept in the set of unprepared data and one or more concepts in the set of transformed data, and wherein the set of semantic transformation associations are attributes that categorize the transformation;
   training a machine learning catalog builder through a machine learning process on new data to determine one or more functions to transform the new data to transformed new data, wherein the machine learning process operates on the set of unprepared data, the set of transformed data, and the set of semantic text descriptions to learn functions for transforming the set of unprepared data to the set of transformed data;
   executing the machine learning catalog builder on the new data to generate a recommendation, for each portion in a plurality of portions of the new data, of a corresponding function to transform that portion of the new data into a corresponding portion of transformed new data; and
   executing, for each portion in the plurality of portions of the new data, the corresponding function to transform that portion of the new data into the corresponding portion of transformed new data in the data repository.

2. The method of claim 1, further comprising:
   presenting, by the data processing system, the set of transformed data to an operator for validation to ensure accuracy and usefulness.

3. The method of claim 1, wherein each function in the set of functions each have an associated text description that detail how the function acts on the unprepared data as the data is transformed to the set of transformed data.

4. The method of claim 1, further comprising:
   responsive to the set of transformed data failing to adhere to one or more governance policies, presenting, by the data processing system, the set of transformed data to an operator for data preparation parameter changes or manual updates to the transformation, wherein, in presenting the set of transformed data to the operator, the set of semantic text descriptions associated with the set of transformed data are presented for operator validation.

5. The method of claim 1, wherein transforming the set of unprepared data based on the set of functions utilizes one or more predefined functions.

6. The method of claim 1, wherein transforming the set of unprepared data based on the set of functions utilizes one or more trained functions and wherein the one or more trained functions are generated by the method comprising:
   for each field in a set of new data that differs from any previously analyzed data, identifying, by the data processing system, one or more existing functions for transforming the new data using a set of text descriptions associated with the new data and previously transformed data;
   ranking, by the data processing system, the one or more identified existing functions;
   determining, by the data processing system, whether a top ranked function is above a predetermined threshold; and
   responsive to the top ranked function being above the predetermined threshold, utilizing, by the data processing system, the top ranked function to transform the set of unprepared data.

7. The method of claim 6, further comprising:
responsive to no function being above the predetermined threshold, presenting, by the data processing system, the identified functions as ranked to an operator; and
responsive to receiving a selection of one of the identified functions from the operator, utilizing, by the data processing system, the selected function to transform the set of unprepared data.

8. A computer program product comprising a computer readable storage medium having a computer readable program stored therein, wherein the computer readable program, when executed in a data processing system, causes the data processing system to:
ingest data and metadata related to the data from a set of data sources thereby forming a set of unprepared data;
transform the set of unprepared data based on a set of functions into a set of transformed data;
generate a set of semantic text descriptions that detail how the set of functions transform the set of unprepared data to the set of transformed data using a first set of semantic associations, a second set of semantic associations, and a set of semantic transformation associations, wherein the first set of semantic associations are generated between two or more concepts in the set of unprepared data, wherein the first set of semantic associations are verbs or verb phrases, wherein the second set of semantic associations are generated between two or more concepts in the set of transformed data, wherein the second set of semantic associations are verbs or verb phrases, wherein the set of semantic transformation associations are generated between each concept in the set of unprepared data and one or more concepts in the set of transformed data, and wherein the set of semantic transformation associations are attributes that categorize the transformation;
train a machine learning catalog builder through a machine learning process on new data to determine one or more functions to transform the new data to transformed new data, wherein the machine learning process operates on the set of unprepared data, the set of transformed data, and the set of semantic text descriptions to learn functions for transforming the set of unprepared data to the set of transformed data;
execute the machine learning catalog builder on the new data to generate a recommendation, for each portion in a plurality of portions of the new data, of a corresponding function to transform that portion of the new data into a corresponding portion of transformed new data; and
execute, for each portion in the plurality of portions of the new data, the corresponding function to transform that portion of the new data into the corresponding portion of transformed new data in a data repository.

9. The computer program product of claim 8, wherein the computer readable program further causes the data processing system to present the set of transformed data to an operator for validation to ensure accuracy and usefulness.

10. The computer program product of claim 8, wherein each function in the set of functions each have an associated text description that detail how the function acts on the unprepared data as the data is transformed to the set of transformed data.

11. The computer program product of claim 8, wherein the computer readable program further causes the data processing system to present, responsive to the set of transformed data failing to adhere to one or more governance policies, the set of transformed data to an operator for data preparation parameter changes or manual updates to the transformation, wherein, in presenting the set of transformed data to the operator, the set of semantic text descriptions associated with the transformed data are presented for operator validation.

12. The computer program product of claim 8, wherein transforming the set of unprepared data based on the set of functions utilizes one or more predefined functions.

13. The computer program product of claim 8, wherein transforming the set of unprepared data based on the set of functions utilizes one or more trained functions, and wherein the one or more trained functions are generated by:
identifying, for each field in a set of new data that differs from any previously analyzed data, one or more existing functions for transforming the new data using a set of text descriptions associated with the new data and previously transformed data;
ranking the one or more identified existing functions;
determining whether a top ranked function is above a predetermined threshold; and
utilizing, responsive to the top ranked function being above the predetermined threshold, the top ranked function to transform the set of unprepared data.

14. The computer program product of claim 13, wherein the computer readable program further causes the data processing system to:
present, responsive to no function being above the predetermined threshold, the identified functions as ranked to an operator; and
utilize, responsive to receiving a selection of one of the identified functions from the operator, the selected function to transform the set of unprepared data.

15. An apparatus comprising:
at least one processor; and
at least one memory coupled to the at least one processor, wherein the at least one memory comprises instructions which, when executed by the at least one processor, cause the at least one processor to:
ingest data and metadata related to the data from a set of data sources thereby forming a set of unprepared data;
transform the set of unprepared data based on a set of functions into a set of transformed data;
generate a set of semantic text descriptions that detail how the set of functions transform the set of unprepared data to the set of transformed data using a first set of semantic associations, a second set of semantic associations, and a set of semantic transformation associations, wherein the first set of semantic associations are generated between two or more concepts in the set of unprepared data, wherein the first set of semantic associations are verbs or verb phrases, wherein the second set of semantic associations are generated between two or more concepts in the set of transformed data, wherein the second set of semantic associations are verbs or verb phrases, wherein the set of semantic transformation associations are generated between each concept in the set of unprepared data and one or more concepts in the set of transformed data, and wherein the set of semantic transformation associations are attributes that categorize the transformation;
train a machine learning catalog builder through a machine learning process on new data to determine one or more functions to transform the new data to transformed new data, wherein the machine learning process operates on the set of unprepared data, the set of transformed data, and the set of semantic text descriptions to learn functions for transforming the set of unprepared data to the set of transformed data;

execute the machine learning catalog builder on the new data to generate a recommendation, for each portion in a plurality of portions of the new data, of a corresponding function to transform that portion of the new data into a corresponding portion of transformed new data; and execute, for each portion in the plurality of portions of the new data, the corresponding function to transform that portion of the new data into the corresponding portion of transformed new data in a data repository.

16. The apparatus of claim 15, wherein the instructions further cause the at least one processor to present the set of transformed data to an operator for validation to ensure accuracy and usefulness.

17. The apparatus of claim 15, wherein each function in the set of functions each have an associated text description that detail how the function acts on the unprepared data as the data is transformed to the set of transformed data.

18. The apparatus of claim 15, wherein the instructions further cause the at least one processor to present, responsive to the set of transformed data failing to adhere to one or more governance policies, the set of transformed data to an operator for data preparation parameter changes or manual updates to the transformation, wherein, in presenting the set of transformed data to the operator, the set of semantic text descriptions associated with the transformed data are presented for operator validation.

19. The apparatus of claim 15, wherein transforming the set of unprepared data based on the set of functions utilizes one or more predefined functions.

20. The apparatus of claim 15, wherein transforming the set of unprepared data based on the set of functions utilizes one or more trained functions, and wherein the one or more trained functions are generated by:

identifying, for each field in a set of new data that differs from any previously analyzed data, one or more existing functions for transforming the new data using a set of text descriptions associated with the new data and previously transformed data;

ranking the one or more identified existing functions;

determining whether a top ranked function is above a predetermined threshold; and utilizing, responsive to the top ranked function being above the predetermined threshold, the top ranked function to transform the set of unprepared data.

* * * * *